United States Patent Office 3,524,036
Patented Aug. 11, 1970

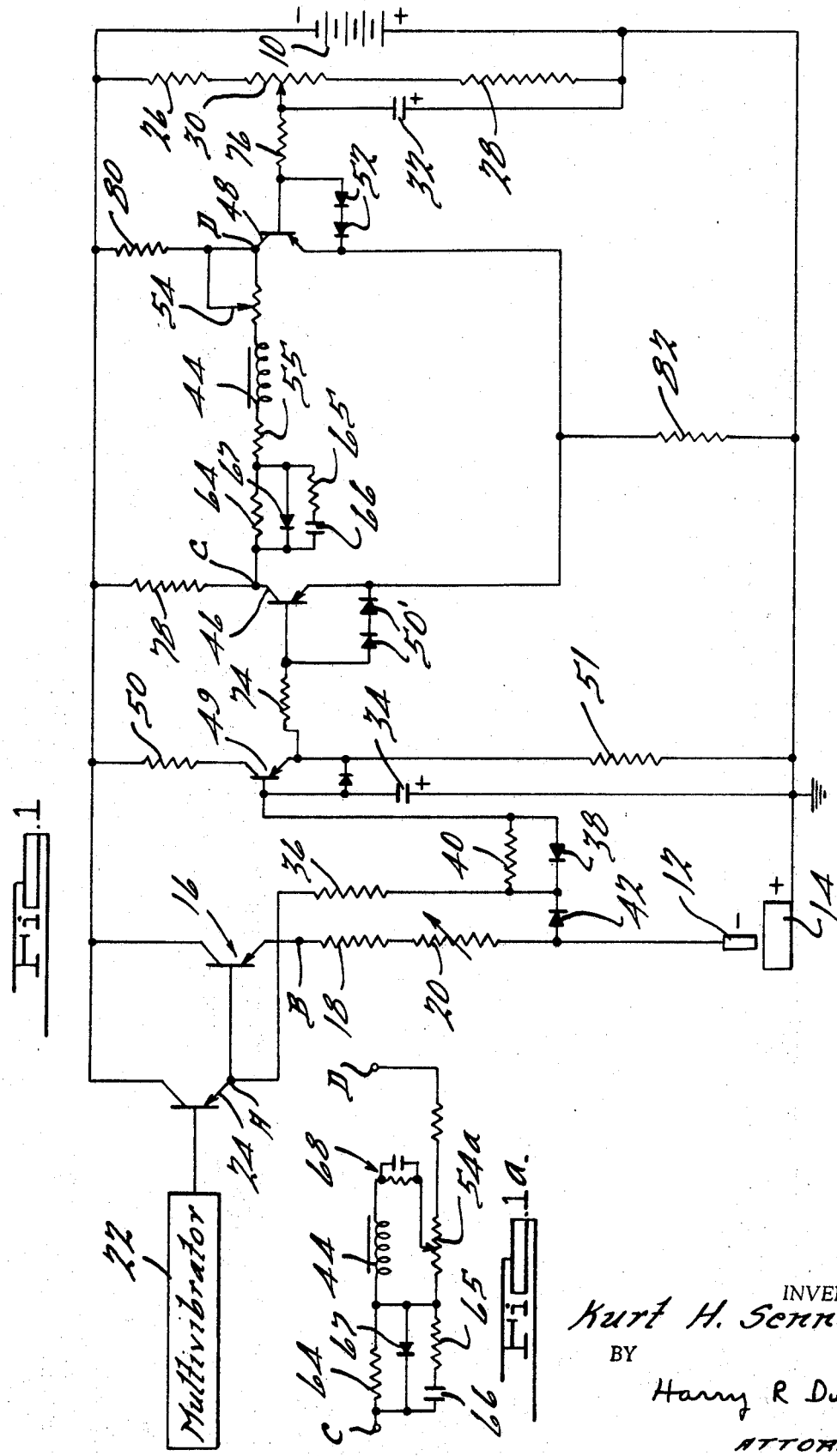

---

3,524,036
SERVO CONTROL CIRCUIT FOR ELECTRICAL DISCHARGE MACHINING APPARATUS
Kurt H. Sennowitz, Royal Oak, Mich., assignor to Elox Inc., Troy, Mich., a corporation of Delaware
Filed Jan. 22, 1968, Ser. No. 699,443
Int. Cl. B23p 1/08
U.S. Cl. 219—69                                   5 Claims

ABSTRACT OF THE DISCLOSURE

A circuit for maintaining relatively constant gap spacing between an electrical discharge machining electrode and workpiece by an electrically operated servo-motive means. The circuit employs a differential amplifier with two transistors controlled by a reference signal applied to the control electrode of one transistor and by a control signal derived from the gap and applied to the control electrode of the other transistor through an emitter-follower stage. A parallel resistor-capacitor network is connected in series with the servo-motive means to keep the servo "alive" for steady feed during slow-feed operation of the circuit.

BACKGROUND OF THE INVENTION

The field to which my invention relates is that known as electrical discharge machining, hereinafter sometimes referred to as EDM, in which material is removed from an electrically conductive workpiece by the action of electrical gap discharges between a tool electrode and the workpiece. An electrode or workpiece servo feed system is employed to maintain an optimum gap spacing between electrode and workpiece as metal removal progresses. A dielectric coolant such as kerosene, or transformer oil is circulated continuously through the gap during machining operation. A major problem is that of providing a servo control circuit which is capable of providing a relatively constant gap and over cut under both roughing and finishing conditions as the material is being removed from the workpiece.

SUMMARY OF THE INVENTION

My invention provides an improved servo feed control circuit capable of controlling any electrically operated motive means for providing relative movement between workpiece and electrode with downfeed provided even during very narrow pulse on-time condition. My circuit is equally useful in electrohydraulic systems as shown or in the direct control of electrical motors or the like. The circuit employs a differential amplifier with two transistors controlled in their conduction by a reference signal applied to the control electrode of one and by a control signal derived from the drive signal and gap applied to the control electrode of the other through an emitter follower stage. The control signal is derived from a network connected between a drive signal source in the electronic power supply itself and the gap as will be explained hereinafter.

DESCRIPTION OF THE DRAWINGS

FIG. 1 is a combined schematic, diagrammatic showing of my invention. FIG. 1a shows a modification of a portion of that circuit. The electrical discharge machining power supply includes a main machining power source 10. The machining power pulses are passed to the gap between tool electrode 12 and workpiece 14 through periodic operation of output transistor 16 which has its power electrodes, i.e., collector and emitter in series between power source 10 and the gap. Fixed resistor 18 and rheostat 20 are series connected between the emitter of transistor 16 and the gap to provide for control of cutting current being passed to the gap. A pulser or multivibrator 22 is used to provide variable on-off time, variable frequency triggering pulses through one or more drive stages 24 to operate transistor 16. Several types of multivibrators suitable for use in this type of elecrical discharge machining power supply are shown and described in Lobur U.S. Pat. No. 3,243,567 issued on Mar. 29, 1966 and entitled "Electrical Discharge Machining Apparatus." While my invention is shown in connection with a transistorized EDM power supply, it is not so limited but may be employed in any supply where an electronic switch is connected between a DC power source and the machining gap and periodically triggered into operation. By "electronic switch" is meant any electronic control device having three or more electrodes comprising at least two power electrodes acting to control current flow in the power circuit, the conductivity of the power circuit being controlled by a control electrode within the switch whereby the conductivity of the power circuit is controlled statically or electrically without movement of any mechanical elements within the switch. Included within this definition are vacuum tubes, transistors and the like.

My servo control circuit has its reference voltage derived from a resistor network connected in shunt with DC source 10 which source constitutes the main machining power supply. It includes fixed resistors 26, 28 connected in series with the variable resistor of potentiometer 30. Filter capacitor 32 is connected as shown. The control input for the differential amplifier is taken from the drive signal output from transistor 24 as shown. This signal is compared against an adjustable voltage set by potentiometer 30 to provide down-feed and back-up of the servo feed means. Drive signal charges capacitor 34 through resistor 36 and diode 38 which is poled as shown. Diode 38 is further shunted by resistor 40. The connection of the sensing network is completed to the gap through diode 42 whereby drive signal may be passed into the gap.

The direction of electrode movement is controlled by the direction of current flow through an electrically energized element, in this case an electro-magnetic servo valve coil 44 connected between the collectors of transistors 46 and 48 between points C and D. The full detail of the hydraulic motor and servo valve are not shown herein in the interest of simplifying this disclosure but a number of suitable electrohydraulic EDM servo control systems are shown and described in Webb U.S. Pat. No. 3,230,412 issued on Jan. 18, 1966, entitled "Servo Feed Apparatus for Electrical Discharge Machining." Diodes 50' are connected across the base-emitter junction of transistor 46 to protect it from excess turn-off voltage. Similarly, diodes 52 are connected across the base-emitter junction of transistor 48. A third transistor 49 is coupled to transistor 46 in emitter follower arrangement with protective diode 47 included. Series resistors 50 and 51 are connected in series with the emitter-collector of transistor 49 with the magnitude of resistor 50 being substantially lower than that of resistor 51. The inclusion in the circuit of transistor 49 makes possible the use of a high impedance input to the servo control circuit. During low current cutting operation, stable servo operation is assured. Rheostat 54 has its variable resistor connected between the collector of transistor 48 at point D and the right-hand terminal of coil 44 to provide for adjustment for sensitivity of the servo operation. Potentiometer 54 may optionally be connected as shown in FIG. 1a and identified by the numeral 54a. The placement of potentiometer 54a in shunt with coil 44 as shown by FIG. 1a is preferable during relatively slow feed operation. A parallel RC network is connected in series circuit with resistor 55 and point C. Included in the RC network are resistor 64, resistor 65 and capacitor 66. A fast back-up diode 67 is connected with a polarity as shown. Resistor 65 is included to limit the discharge of capacitor 66. In FIG. 1a, potentiometer 54a is connected in shunt with control coil 44 through an RC network 68. It is the function of RC network 68 to keep the servo "alive" during slow feed operation of the circuit. Current limiting resistors 74 and 76 are connected in circuit with the respective bases of transistors 46, 48. Load resistors 78 and 80 are connected between the respective collectors of transistors 46 and 48 and the negative voltage terminal of DC source 10 while resistor 82 is coupled between the positive terminal of DC source 10 and the emitters of transistors 46, 48.

DESCRIPTION OF OPERATION

When the power supply and multivibrator are turned on, drive signals are passed from transistor 24 to control the operation of output transistor 16. Machining power pulses are provided across the gap with precisely controllable frequency and on-off time or duty factor. At the same time, the negative drive signal is passed through resistor 36 and diode 38 to store on the upper plate of capacitor 34. A portion of this drive signal will be passed to the gap through diode 42. The negative drive signal stored on capacitor 34 provides turn-on of transistor 49 and turn-on of transistor 46. Electron flow then occurs from the negative terminal of DC source 10 through resistor 78, the collector-emitter of transistor 46 and resistor 82 to the positive terminal of DC source 10. At the same time, electron flow occurs through resistor 80, potentiometer 54, in a leftward or downfeed direction through coil 44, through resistors 55, 64 and through transistor 46. The electron flow in a leftward direction through coil 44 causes the electrode 12 to be advanced downwardly toward the work 14. During a shorted gap, the other transistor 48 will be turned on providing inter alia an electron flow through coil 44 in a rightward or up-feed direction to withdraw the electrode 12 and move it upwardly away from workpiece 14 to permit the short circuit condition to be cleared. It is also significant that during a short circuit condition the electrode is being withdrawn from the workpiece and at the same time, by reason of the sensing network used, namely that including resistor 36, diodes 42, 38 and capacitor 34, and its connection to the gap, the drive signal is being virtually all passed to plus gap terminal or ground during a shorted arc gap. This provides both prompt and effective back-up and gap current limiting at the same time.

A feature of particular importance is that of the incorporation of rheostat 54 networks in series with control coil 44. This is important for stable servo action during high frequency cutting. For stable slow feed operation, potentiometer 54a is connected in series with RC network 68 across coil 44. During normal cutting, the hydraulic control coil 44 will pass current in one direction only and hold the gap constant according to the reference setting made on potentiometer 30. In the circuit of FIG. 1, if the gap should short circuit, capacitor 66 will discharge rapidly and provide fast ram back-up for perhaps 0.01 to 0.10 inches. This assists greatly in cutting away particles which may have been accumulated in the gap, and in breaking up the short circuit condition. This provides highly effective pulsing of the gap during up or down feed and particularly improves deep hole cutting by clearing the shorted gap more quickly and preventing the electrode from backing out all the way.

The power feed system described herein is capable of maintaining stable downfeed even during low current finishing operating with very narrow on-time pulses.

While the control signal for the differential amplifier was derived from a network connected between drive signal source and the gap, it would also be possible to connect the upper terminal of the sensing network to point B rather than to point A as indicated on the drawing. Otherwise stated, the sensing network used can derive a valid control signal from an electronic switch in the power supply circuit which is pulsed or operated in unison with the output switch or output switch bank.

It will thus be seen that I have provided a new and improved servo feed control circuit for electrical discharge machining.

I claim:

1. In an electrical discharge machining apparatus having an electronic output switch periodically operated by a drive signal source for providing variable frequency machining power pulses across a dielectric coolant filled gap between a tool electrode and a workpiece, servo means for providing relative movement between said electrode and workpiece including a reversible hydraulic motor and an electrically energized servo coil for controlling its operation responsive to direction of current flow through said coil, a sensing means operatively connected to said gap for providing a voltage which is a function of gap spacing, a reference voltage source, said coil operatively connected between said sensing means and said reference voltage source, wherein the improvement comprises a potentiometer having its variable resistor connected between said reference voltage source and the end of said coil proximate said sensing means, and a parallel resistor-capacitor network, said network connected between the other end of said coil and the movable contact of said potentiometer for operation of said servo during very slow feed operation.

2. The combination as set forth in claim 1 wherein a network comprising a parallel connected resistor, capacitor and diode is further connected in series with said coil between said sensing means and said first end of said coil to provide fast back-up on gap short circuit.

3. In an electrical discharge machining apparatus for machining an electrically conductive workpiece by variable frequency, adjustable on-time machining pulses by a tool electrode across a dielectric coolant filled gap, servo means for providing relative movement between said electrode and workpiece including a reversible motive means, an electrically energized element for controlling operation of said motive means responsive to direction of current flow through said element, a network for sensing an electrical parameter of the gap which is a function of gap spacing, a variable reference voltage source wherein the improvement comprises a differential amplifier including a pair of transistors, each having its power electrodes in series with said element to pass opposite direction current therethrough in response to its conduction, one of said transistors having its control electrode operatively connected to said sensing network output, the other of said transistors having its control electrode operatively connected to said reference voltage source, a parallel resistor-capacitor network, a potentiometer having a variable resistor and a movable contact, said resistor-capacitor network connected between one end of said element and said movable contact of said potentiometer, said variable resistor of said potentiometer connected between the other end of said element and a power electrode of said second mentioned transistor.

4. The combination as set forth in claim 3 wherein a third transistor is connected in emitter-follower arrangement between said sensing means and its associated transistor to maintain operation of said motive means during relatively low current cutting.

5. In an electrical discharge machining apparatus having an electronic output switch periodically operated by a drive signal source for providing variable frequency machining power pulses across a dielectric coolant filled gap between a tool electrode and a workpiece, servo means for providing relative movement between said electrode and workpiece including a reversible motive means and an electrically energized element for controlling operation of said motive means responsive to direction of current flow through said element, a network for sensing the output from said drive signal source which is a function of gap spacing, and a reference voltage source, said element coupled between said sensing network and said reference voltage source, wherein the improvement comprises a parallel resistor-capacitor network, a potentiometer having a variable resistor and a movable contact, said resistor-capacitor network connected between said contact and one end of said element, said variable resistor connected between the other end of said element and said reference voltage source.

References Cited
UNITED STATES PATENTS 2,927,191   3/1960   Matulaitis.

RALPH F. STAUBLY, Primary Examiner